(12) United States Patent
Novak et al.

(10) Patent No.: US 7,234,666 B2
(45) Date of Patent: Jun. 26, 2007

(54) PIVOTING STORAGE BIN AND METHOD OF MAKING

(75) Inventors: Keith H. Novak, Shoreline, WA (US); Roberto T Valdez, Renton, WA (US); Brent C Walton, Renton, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 11/070,521

(22) Filed: Mar. 2, 2005

(65) Prior Publication Data
US 2006/0214055 A1 Sep. 28, 2006

(51) Int. Cl.
*B64D 11/00* (2006.01)

(52) U.S. Cl. .................................. 244/118.5

(58) Field of Classification Search ............. 244/118.5, 244/118.1, 117 R; 312/269, 266, 247, 248
See application file for complete search history.

(56) References Cited

U.S. PATENT DOCUMENTS

| | | | | |
|---|---|---|---|---|
| 4,275,942 A | * | 6/1981 | Steidl ......................... | 312/266 |
| 4,368,937 A | * | 1/1983 | Palombo et al. ............ | 312/325 |
| 5,441,218 A | * | 8/1995 | Mueller et al. ........... | 244/118.1 |
| 5,567,028 A | * | 10/1996 | Lutovsky et al. ............ | 312/246 |
| 5,820,076 A | * | 10/1998 | Schumacher et al. ..... | 244/118.5 |
| 5,823,472 A | * | 10/1998 | Luria ...................... | 244/118.1 |
| 5,842,668 A | * | 12/1998 | Spencer ................... | 244/118.1 |
| 5,934,615 A | | 8/1999 | Treichler et al. ......... | 244/118.5 |
| 6,290,175 B1 | * | 9/2001 | Hart et al. ............... | 244/118.5 |
| 6,527,325 B2 | | 3/2003 | Steingrebe et al. ........ | 296/37.7 |
| 6,802,478 B2 | * | 10/2004 | Katori ..................... | 244/118.1 |

* cited by examiner

*Primary Examiner*—Tien Dinh
(74) *Attorney, Agent, or Firm*—Klein, O'Neill & Singh, LLP; Tejinder Singh

(57) ABSTRACT

A storage bin system for holding luggage or the like has an upper shroud portion secured to a supporting structure and a cooperating lower bucket defining a storage space for items. The lower bucket pivots downwardly to open and has a curved front face with curved inner and outer surfaces. A latch handle is centrally mounted in the front surface and operatively connected to a latch operating mechanism secured to the inner surface. A flat bottom plate is removably mounted on the curved inners surface, covering the latch operating mechanism to from a flat surface to support items inserted into the storage space. A number of the storage bin systems are mounted on opposite sides of a passenger cabin of a single aisle aircraft to provide a cleaner, open passenger cabin look.

4 Claims, 5 Drawing Sheets

PIVOTING STORAGE BIN AND METHOD OF MAKING

BACKGROUND OF THE INVENTION

1. Field of the Invention

This invention generally relates to storage bins, and more particularly, to pivotable stow bins for a vehicle, such as an aircraft, and a method of making such stow bins.

2. Description of the Prior Art

As more people travel, demand for onboard storage of carry-on luggage has increased, in aircraft, as well as busses, ships, trains and other means of mass transit. The known luggage storage bins take various forms, depending on the size of the vehicle, such as overhead luggage bins in the interior of an aircraft having upwardly swinging doors, or pull-down storage bins.

One type of known overhead stowage bin for an aircraft consists of an upper bin portion ("shroud") adapted to be mounted to supports and a cooperating lower bin portion ("bucket") that opens downward for receiving luggage. The bucket includes means to control motion of the bucket, as well as an operating handle on its exterior surface, near its top-most portion, adjacent the shroud when the overhead storage or luggage bin is closed. When the handle is operated, as by pulling, to open the luggage bin, the bucket moves downward to enable persons to insert luggage or other items into, or remove luggage or other items from the bucket.

The operating handles of these known overhead storage bins may be difficult to open or reach by some passengers because of the placement of the operating handle near the top-most portion. Furthermore, during the assembly or manufacture of the known buckets, small dimples may appear through a covering laminate on the visible front surface of the bucket when an insert is potted on the opposite side of the front of the bucket, thus resulting in the bucket being rejected, causing costly rework and/or replacement.

Additionally, because of the curved interior surface of the front face of the known buckets, and, in particular, latch covers held on the internal surface of the front, problems have occurred in inserting or removing luggage because of the need to "drag" the luggage over the "bump" caused by the latch cover. Also, in some instances, adaptor panels must be added to the curved interior surface of the front face of known buckets when other items, such as emergency or video equipment is mounted in the buckets.

Therefore, there exists a need in the art for improved luggage storage bins for aircraft or the like and a method of making the same, which storage bins overcome known problems, are more easily operated and manufactured, and which allow for easier and smoother loading and removal of luggage and other items from the interior of a lowered bucket.

SUMMARY OF THE INVENTION

Accordingly, it is a general object of the present invention to provide an improved storage bin. It is a particular object of the present invention to provide an improved overhead luggage storage bin in a vehicle. It is a further particular object of the present invention to provide an improved overhead luggage storage bin in an aircraft having an upper shroud and a lower bucket with a centrally disposed handle. It is yet another particular object of the present invention to provide an improved overhead luggage storage bin in an aircraft having an upper shroud and a pivoting lower bucket with a centrally disposed operating handle secured in a curved front face operatively connected to an interior latch operating mechanism having a flat bottom panel covering and protecting the latch operating mechanism. It is a still further particular object of the present invention to provide an improved overhead luggage storage bin system for a single aisle aircraft, in which a plurality of storage bins are disposed on opposed sides of the single aisle and comprise upper shrouds and pivoting lower buckets with centrally disposed handles secured in curved front faces connected to interior latch operating mechanisms with flat bottom panels covering and protecting the latch operating mechanisms. And, it is yet still another particular object of the present invention to provide a method of making an improved overhead luggage storage bin system for an aircraft comprising pivoting lower buckets having flat interior bottom panels.

In accordance with one aspect of the present invention, there is provided a storage bin assembly, comprising a storage bin having an upper shroud assembly secured to a support structure and a lower bucket assembly cooperating with the upper shroud assembly to contain a storage space. The lower bucket assembly is movable between an upper closed position and a lowered open position whereby items may be inserted and removed from the storage space and has a curved front with a curved inner surface and a curved outer surface. A handle is centrally mounted to the curved outer surface and operatively connected to a latch operating mechanism secured to the curved inner surface with a substantially flat bottom plate secured over the curved inner surface and the latch operating mechanism to form a substantially flat surface for supporting items in the storage space.

A preferred embodiment of the invention is made by forming a lower bucket assembly with an interior storage space having a rear wall, a pair of planar end walls, a top wall and a bottom wall formed from a flat panel inserted over a curved inner surface of a curved front face of the bucket assembly. A plurality of the storage bin assemblies having pivoting lower buckets as described may be mounted on opposite sides of a single aisle aircraft cabin over a plurality of rows of seats.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

DESCRIPTION OF THE PREFERRED EMBODIMENTS

Figure 1:
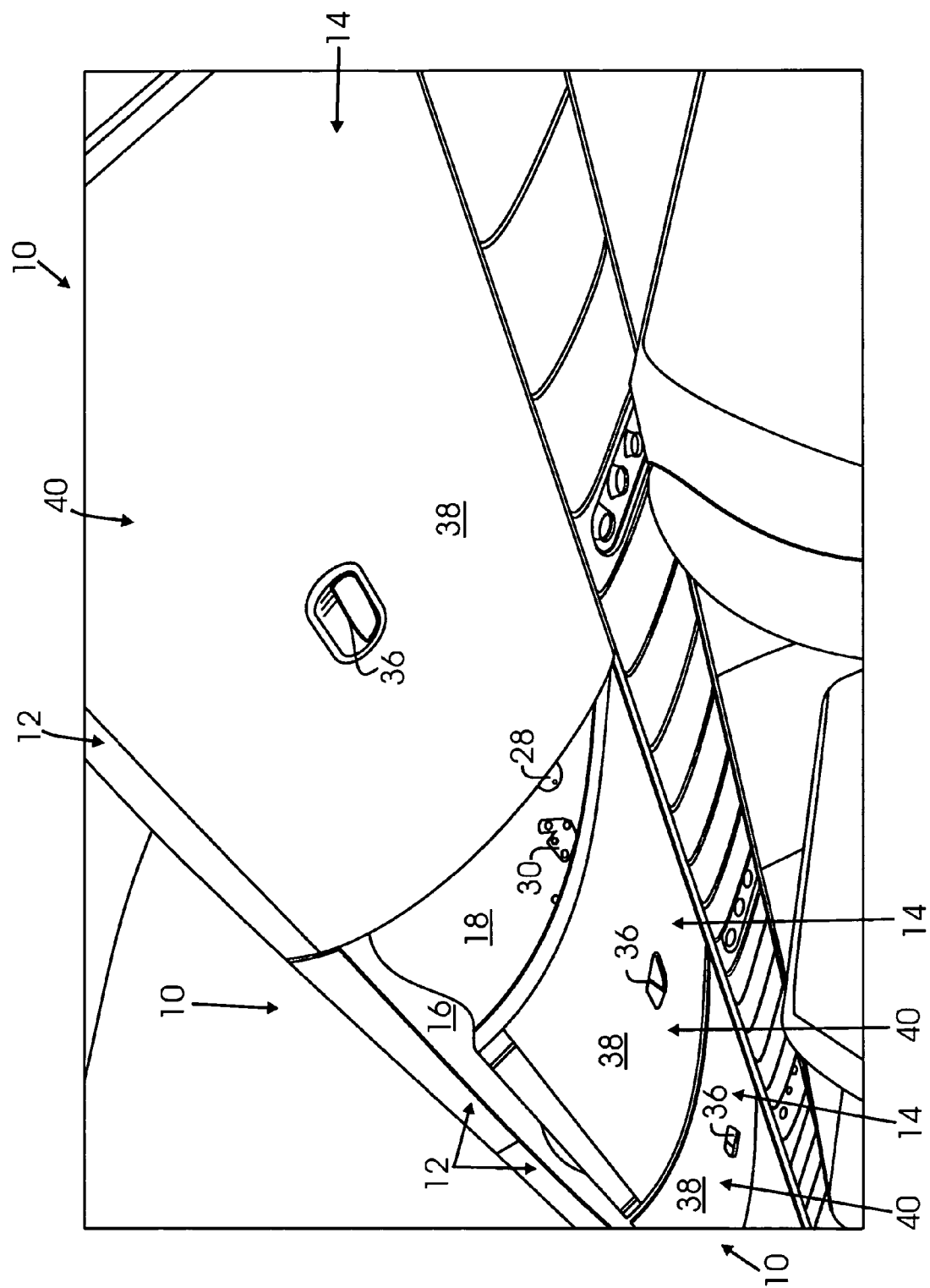
FIG. 1 is a perspective view of a currently preferred embodiment of an improved pivoting or pull-down storage bin system of the present invention, used as overhead storage compartments for passenger carry-on luggage in an aircraft, with a lower movable bucket portion shown in an open position.
Figure 2:
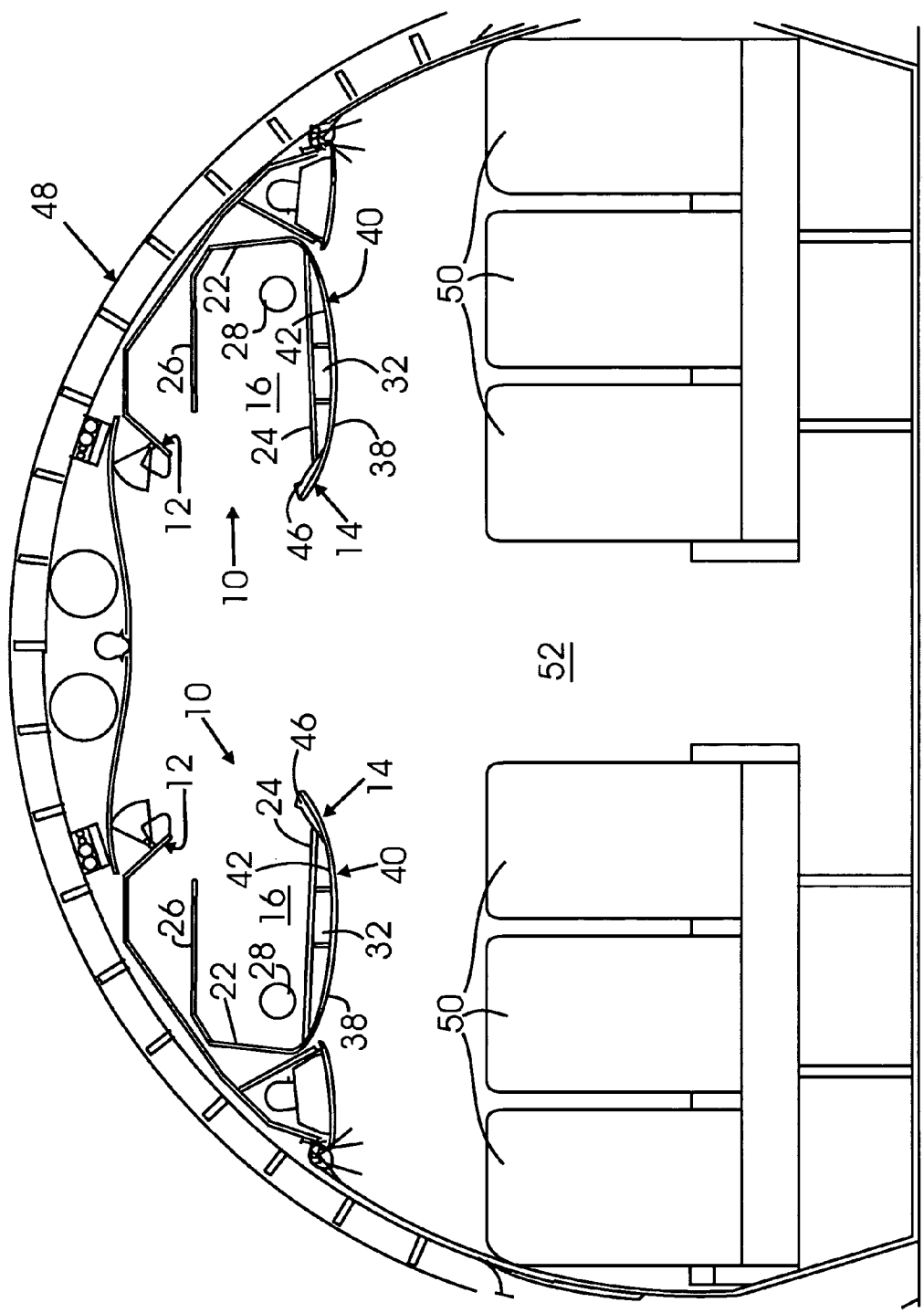
FIG. 2 is schematic cross-sectional view of a single aisle aircraft passenger cabin showing open storage bins of the present invention mounted on opposed sides over rows of passenger seats.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved storage bin assembly for a vehicle. The storage bins of the present invention are hereinafter described as overhead pull-down luggage storage bins or pivot stow bins for reasons of explanation only and not by way of limitation. The pivot stow bins include pivoting lower bucket portions having centrally mounted operating handles that are easier to reach and operate. The handles are operatively connected to a latch operating mechanism mounted on the internal surface or wall of the front of the bucket and covered by an internally mounted flat bottom plate. The flat bottom plate adds stiffness/strength to the bucket while covering and protecting the latch operating mechanism. The centrally mounted operating handle and flat bottom plate in the bucket allow easier opening and closing as well as easier and smoother loading and unloading of luggage and other items.

The improved luggage storage bin system of the present invention may be used anyplace, but is preferably used in a single aisle aircraft, over opposed rows of passenger seats on each side of the aisle to provide a cleaner, aesthetic looking passenger cabin. A currently preferred embodiment of an overhead luggage storage or stow bin is indicated by the numeral 10 throughout the various figures of the drawings. The storage bins 10 are adapted to be selectively mounted to supporting elements or means in a vehicle, such as an aircraft, in any available or desired position, but preferably overhead.

Each storage bin assembly 10 includes an upper bin portion or shroud 12 fixedly mounted or supported in an overhead position in a vehicle, such as an aircraft, in a manner well known to those skilled in the art. A lower bin portion or bucket 14 is movably mounted in the shroud 12, so as to be pivotably movable between an upper closed position, away from an aircraft aisle, as shown by the storage bins to the right and left in FIG. 1 and a lower open position, downwardly, toward an aircraft aisle, as shown by the middle storage bin in FIG. 1 and the storage bins shown in FIGS. 2–5. An inner, interior or storage chamber 16 is formed in each bucket 14 between opposed bulkheads or planar ends 18, 20, a rear surface or wall 22, a flat bottom plate 24 and a top wall 26. Each storage bin 10 includes cooperating elements or means interconnecting the two bin portions 12, 14 to latch the bucket in the closed position and to allow controlled movement of the bucket between the closed and opened positions. For example, the bucket 14 is preferably pivotably mounted at opposite ends 18, 20 by pivot elements or means 28, in a known manner, and includes latching elements or means 30 controlled by torque tubes 32 (see FIG. 4) linking a latch operating mechanism 34 to the bucket ends.

As is best shown in FIG. 1, an operating handle 36 is centrally mounted in a curved outer surface 38 of a curved front 40 of each bucket 14. The handle 36 is operatively connected to the latch operating mechanism 34, secured to a curved inner surface 42 of the curved front 40.

As is best shown in FIGS. 2–5, the flat bottom plate 24 covers and protects the latch operating mechanism 30 and torque tubes 32, while providing a substantially flat surface where items, such as roll on luggage 44 (see FIG. 5) may be easily inserted and removed from the storage chamber 16. The flat bottom plate 24 is preferably removably secured in the bucket 14, as by means desired fasteners such as screws (or by using adhesive, epoxy or any other type of fastener), or the like, in a row along the edge of the lip 46, and on either side of the latch 30 through the side panel 18. Thus eliminating potted inserts for fasteners in the curved inner surface 42, and eliminating visible dimples that may occur in curved outer surface 38. A lip 46, which is preferably shallow, is formed at an outer end of the bucket 14 between the flat bottom plate 24 to aid in keeping items, such as the roll on luggage 44 in the storage chamber. The flat bottom plate 24 may be easily removed and replaced if somehow damaged or otherwise made un-useable, thereby providing a cost efficient, less time consuming alternative to replacing an entire bucket.

Figure 3:
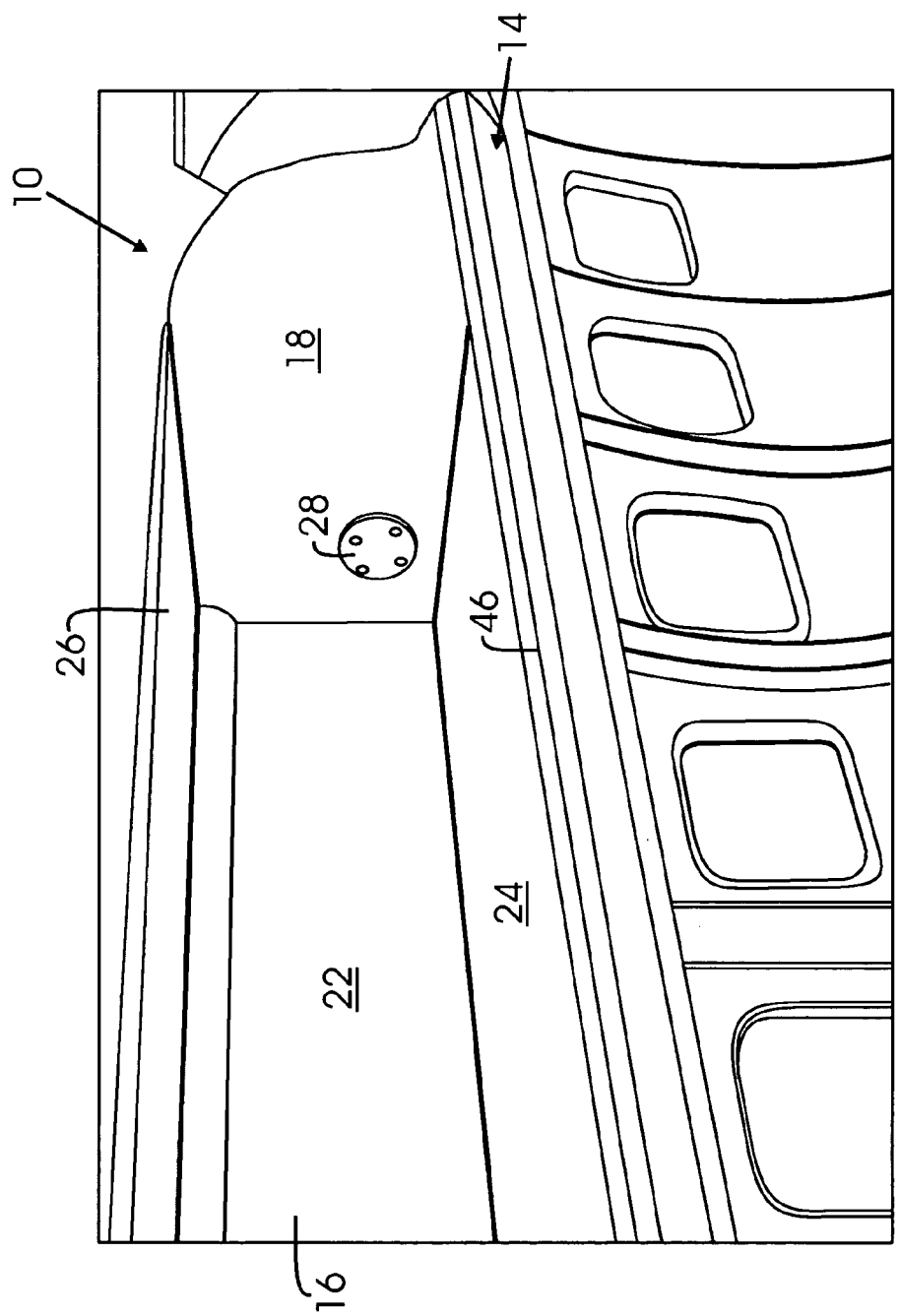
FIG. 3 is an enlarged perspective view of the interior of the open luggage storage bin of FIG. 1, showing a flat bottom plate.
Figure 4:
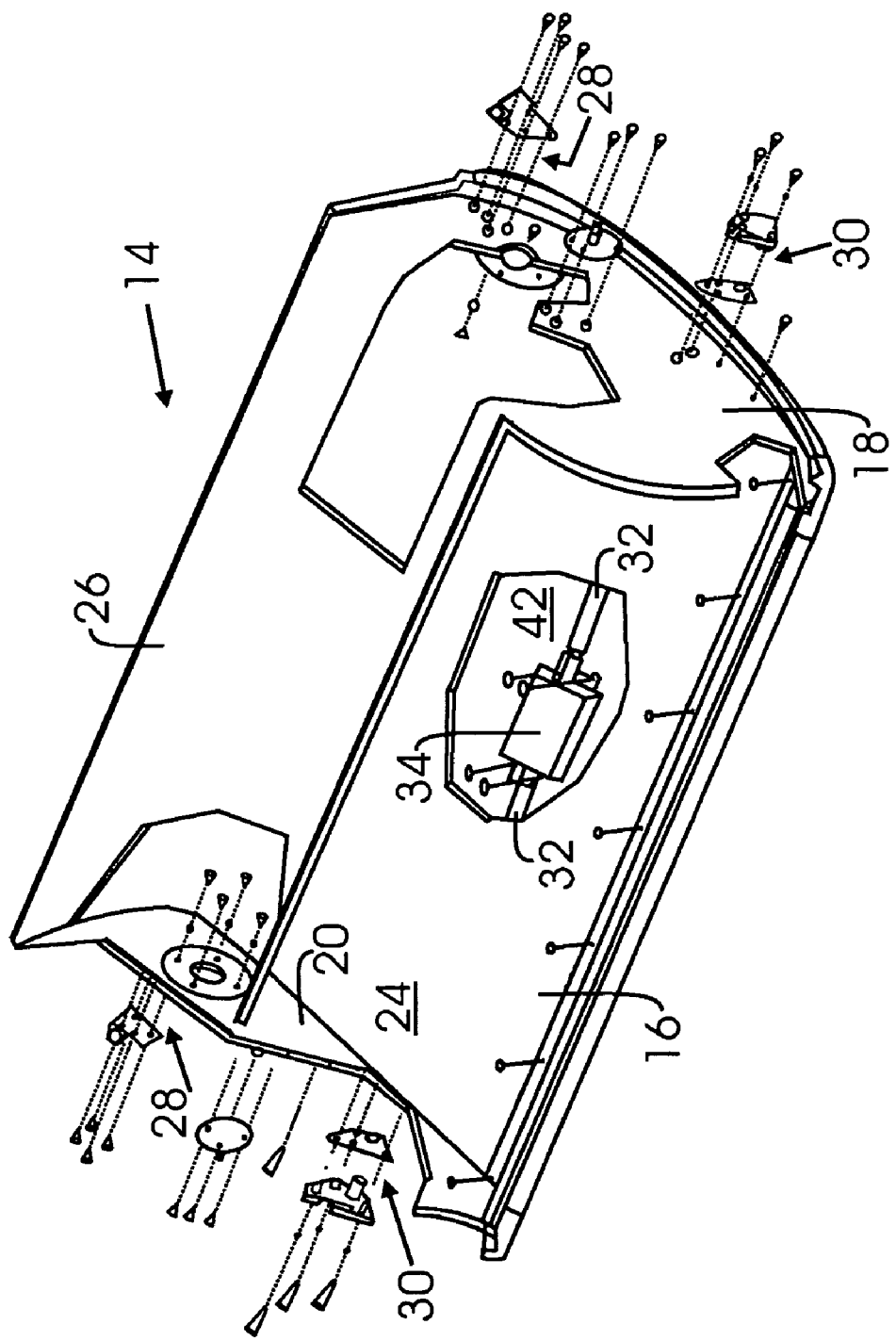
FIG. 4 is an exploded perspective view of a storage bin assembly of the present invention having a lower bucket portion in the open position with portions opposed planar ends, a top wall and a flat bottom plate partly broken away to show various elements, including an internal latch operating mechanism.
Figure 5:
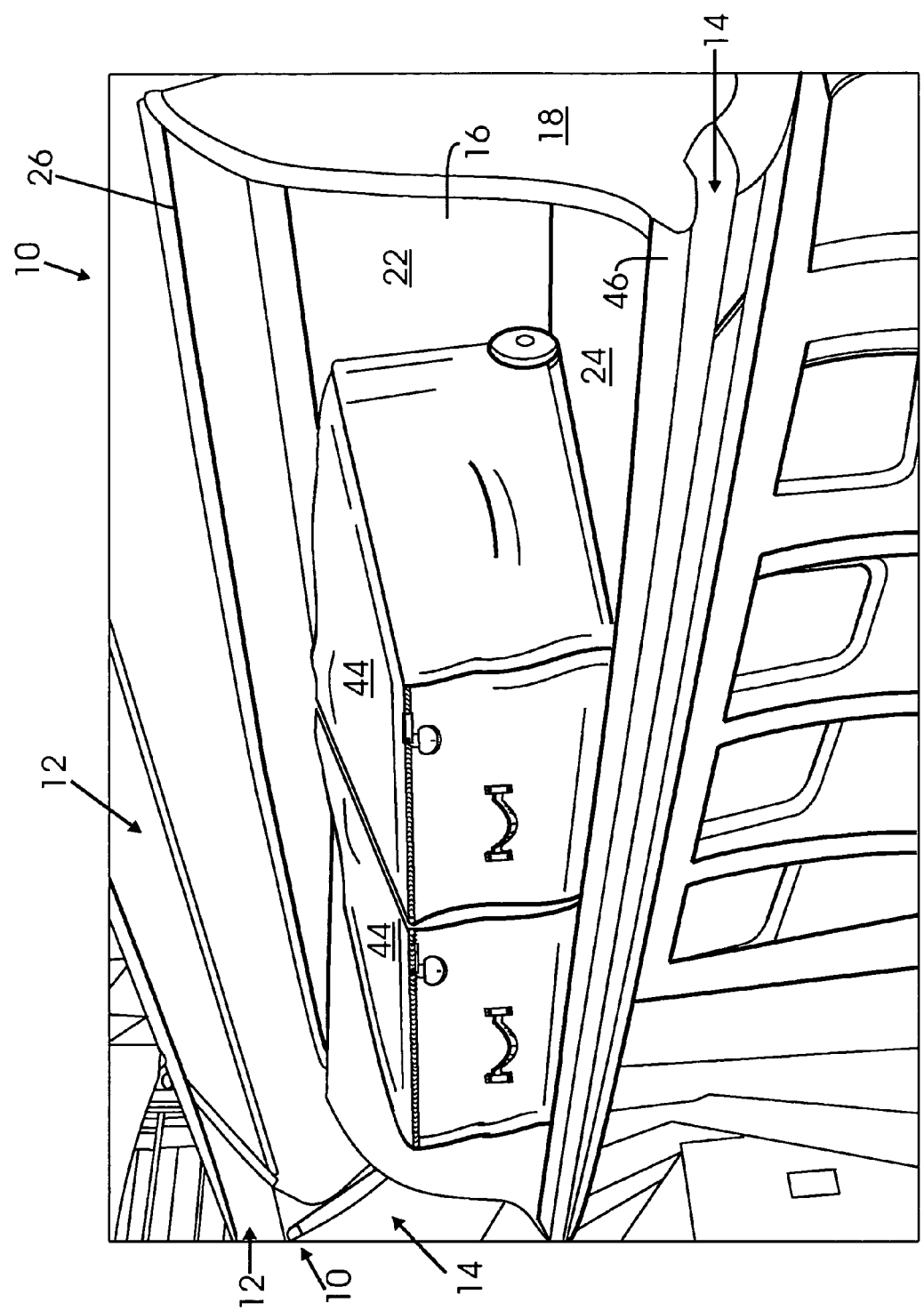
FIG. 5 is a further enlarged perspective view of the interior of the open storage bin of FIG. 1 with roll on luggage inserted in and supported on a flat bottom plate.

As is best shown in FIG. 3, a plurality of luggage storage bins 10 are preferably mounted on opposed sides of a passenger cabin 48 of a single aisle aircraft, over a plurality of passenger seats 50, for example 2 or 3 seats on each side of an aisle 52. The curved outer surfaces 38 of each bucket 14 having the centrally located latches 36, when in the closed position, provide an improved, open look thereby adding to the aesthetics of the passenger cabin. Furthermore, in the lowered position shown, the buckets 14 do not extend into the aisle 52 and the storage chambers 16 are more accessible to passengers for easier and smoother loading and unloading.

There has thus been described a novel and storage bin assembly and method of assembling such a storage bin having a central operating handle and a flat bottom plate for more expeditiously operating the storage bin and easily inserting and removing items from overhead storage in a mass transit vehicle, such as an aircraft or the like.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A method of forming an open passenger cabin for an aircraft, comprising:
 providing an aircraft with a passenger cabin having a single aisle and a plurality of rows of seats on each side of the aisle, and a plurality of overhead storage bins over the plurality of rows of seats on each side of the single aisle, each of the overhead storage bins including fixed upper shrouds and movable lower buckets having curved fronts facing toward the single aisle, each of the movable lower buckets including a latch operating mechanism positioned on a center portion of a curved inner surface of the curved front;

operatively connecting operating handles on the center portion of each of the curved fronts with the latch operating mechanisms on the curved inner surface of the curved front; and mounting in each of the movable lower buckets removable substantially flat bottom plates on the curved inner surfaces of the curved fronts to form substantially flat surfaces to support items, the removable substantially flat bottom plates positioned over the center portion to cover the latch operating mechanisms.

2. The method of claim 1 including the further step of providing each of the movable lower buckets with latch operating mechanisms on the curved inner surfaces of the front.

3. The method of claim 2 including the further step of operatively connecting the centrally mounted operating handles on the curved fronts with the latch operating mechanisms on the curved inner surfaces.

4. The method of claim 3 including the further step of providing each of the movable lower buckets with removable substantially flat bottom plates over the latch operating mechanisms on the curved inner surfaces of the fronts to form substantially flat surfaces to support items.

* * * * *